United States Patent [19]

Bradley et al.

[11] Patent Number: 4,710,906
[45] Date of Patent: Dec. 1, 1987

[54] METHOD AND SYSTEM FOR MONITORING THE STABILITY OF BOREHOLES

[75] Inventors: William B. Bradley, Dallas; Philip Holbrook, Houston, both of Tex.

[73] Assignee: NL Industries, Inc., New York, N.Y.

[21] Appl. No.: 891,773

[22] Filed: Jul. 30, 1986

[51] Int. Cl.$^4$ ............................................. G01V 1/00
[52] U.S. Cl. ...................................... 367/35; 367/86; 73/151; 175/40
[58] Field of Search ...................... 367/25, 35, 37, 73, 367/86; 181/105; 73/783, 784, 151; 175/50; 166/250

[56] References Cited

U.S. PATENT DOCUMENTS

| | | | |
|---|---|---|---|
| 3,588,800 | 6/1971 | Moore et al. | 367/86 |
| 3,885,423 | 5/1975 | Schuermann et al. | 73/151 |
| 3,896,668 | 7/1975 | Anderson et al. | 73/152 |

Primary Examiner—Charles T. Jordan
Assistant Examiner—John W. Eldred
Attorney, Agent, or Firm—Browning, Bushman, Zamecki & Anderson

[57] ABSTRACT

The potential for failure of a formation is predicated by using standard logging apparatus and techniques to monitor the change in a formation characteristic over an extended time period. Changes in this characteristic are attributed to absorption of fluid by the formation which could lead to a possible breakdown of the structural integrity of the formation.

2 Claims, 7 Drawing Figures

METHOD AND SYSTEM FOR MONITORING THE STABILITY OF BOREHOLES

BACKGROUND OF THE INVENTION

1. Field of the Invention

The present invention relates to a method and system for detecting instability of formations through which a borehole passes and in particular to measuring change in a logable characteristic as an indicator of the change in the tendency of a formation to swell.

2. Description of the Background

There are many factors to be considered in drilling a borehole in the earth. One important factor which must be considered is the stability of the various formations through which the borehole passes. There are well known methods and apparatus for dealing with unstable formations, and it becomes a significant factor in determining which method and apparatus will be the most appropriate and when they must be utilized. For example, one way of dealing with an unstable formation is to change the drilling mud. Some drilling muds will have less of a tendency to invade and/or react with a surrounding formation than another drilling mud, the difference being primarily due to the chemical composition of the drilling mud and its relative density. Most drilling muds contain chemical compounds which keep the mud clays in suspension. These same compounds react with shale formations causing them to break down. This could lead to failure of the borehole if corrective action is not promptly instituted.

The detection and prevention of borehole failure resulting from enlargement (sloughing) or contraction (tight hole) is an important factor in the successful drilling of a well. Borehole instability occurs when a stress in the formation at the borehole wall exceeds the strength of the formation. The interaction of the drilling muds, in particular with shale formations, can result in swelling of the shale and failure of the well bore. The swelling of shales constitute a major cause of borehole instability since most sands and limestones are not affected by normal drilling muds. The measurement of the initial shale properties and subsequent change in these properties would allow the direct monitoring of borehole stability and lead to a substantial reduction in the cost of drilling.

There have been attempts to monitor swellings of formations, due to adsorptions of drilling muds and pressure changes. However, these have all had several major problems including the fact that they depended upon particles returned to the surface and required wet chemistry analysis. It is substantially impossible to determine exactly where the particles originated from in the borehole. Also, there are substantial delays associated with wet chemistry analysis.

SUMMARY OF THE INVENTION

The present invention utilizes logging measurements, such as resistivity, gamma ray or porosity, taken with any logging equipment, either measuring-while-drilling or wire line, to measure characteristic of a formation, particularly those formations believed to have a tendency toward instability. Subsequent readings of the same characteristic are made over extended time periods. The change noted in measured characteristic can be compared to laboratory test results of known similar formations, the testing having been done under as close as possible to in situ conditions. By knowing the change in the formation characteristic, the drilling engineer is able to predict any decrease in stability and take such steps as are necessary to prevent degradation of the borehole due to the collapse of a particular formation.

BRIEF DESCRIPTION OF THE DRAWINGS

The present invention will now be described by way of example with reference to the accompanying drawings in which.

DETAILED DESCRIPTION OF THE PREFERRED EMBODIMENT

The least expensive drilling fluid is a water-based mud whic includes, other than water and earth solids (mostly clay) a complex three-phase mixture of liquids, reactive solids and inert solids, at least some of which are intended to keep the mixture fluid. However, when such a drilling fluid is used in a shale formation, the water can be absorbed into the shale and/or the mud contents chemically react to create a weakened formation. The present invention contemplates the use of any formation logging device, including both wire line and measuring-while-drilling devices such as resistivity, gamma ray or porosity measuring devices, possibly having multiple depth investigation capability, to measure a characteristic of a formation. The measurements of this characteristic are repeated over a time span with any change being an indicator of a change in the structural integrity of the formation. Samples of a suspect formation can be laboratory tested to determine the characteristics of absorption versus the various mud systems.

Figure 1:
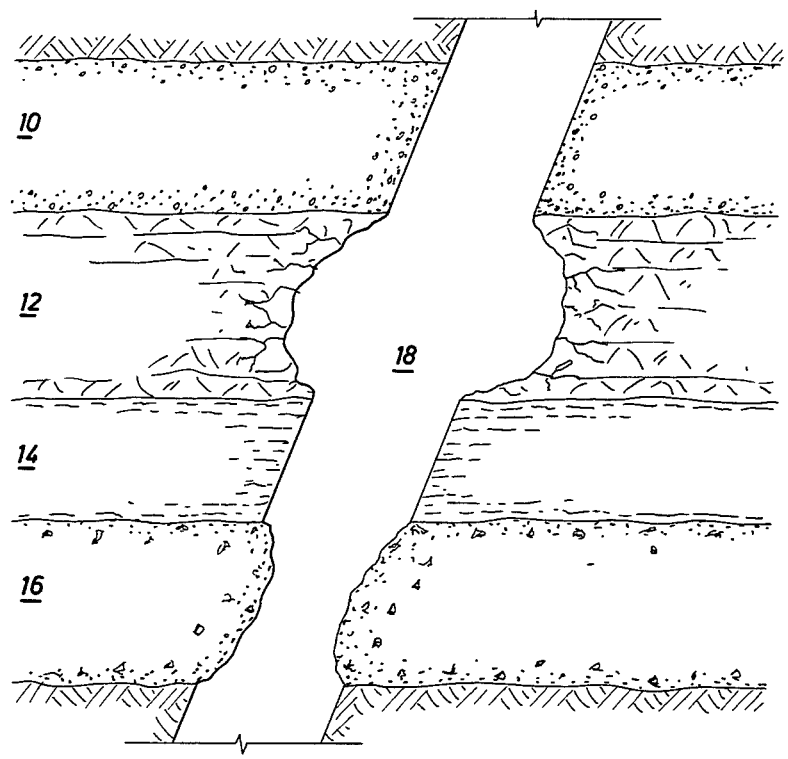
FIG. 1 is a schematic side elevation through a borehole showing failure of a formation resulting in borehole enlargement and reduction.
Figure 2:
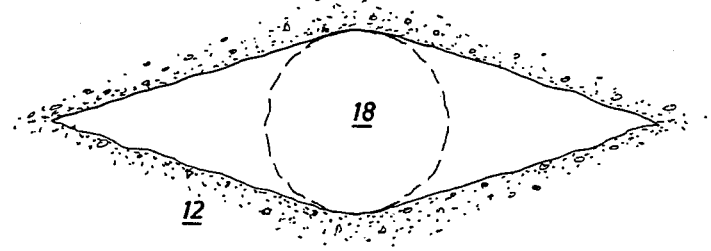
FIG. 2 is a schematic transverse section through the borehole of FIG. 1.

FIG. 1 schematically illustrates four consecutive formations 10, 12 14 and 16 traversed by borehole 18. Formations 10 and 14 are stable while formation 12 is sloughing to enlarge the borehole and formation 16 is collapsing to contract the borehole. In the case of either unstable formation 12, 16, the instability would be the result of absorption/reaction of the drilling fluid by the formation. Any instability will be threedimensional in nature and rarely uniform with respect to the borehole axis, as schematically illustrated in FIG. 2.

The present invention detects a tendency toward instability by measuring the change of a formation characteristic by resistivity, gamma ray, and/or porosity measurement techniques as the drilling fluid is absorbed. When shales come into contact with water-based drilling muds, they begin to absorb the water and other drilling mud compounds and normally tend to swell and lose their strength characteristics. A shale's tendency to change its strength is directly related to its cation exchange capacity, which also effects its initial detectable electrical resistivity. The most susceptible shales can be readily identified by an initial logging run.

The ultimate swelling potential of a formation is determined by its cation exchange capacity. This can be estimated from log-derived measurements using the equation:

$$C_t = 1/F\,(C_w + BQ_v)$$

where:
- $C_t$ = formation conductivity (mhos/m)
- $F$ = formation resistivity factor
- $C_w$ = water conductivity (mhos/m)
- $BQ_v$ = cation exchange capacity/pore volume Usually the shale volume can be estimated from a normalized gamma ray response. Gamma ray response usually ranges from 10-20 API units for clean sands with no $BQ_v$ to approximately 100 for a shale. A shale baseline can be estimated in a given well by connecting the high gamma ray values. Relative shale volume is assumed to be 1.0 on this line and is linearly scaled between this and zero for the clean sand baseline.

Figure 3:
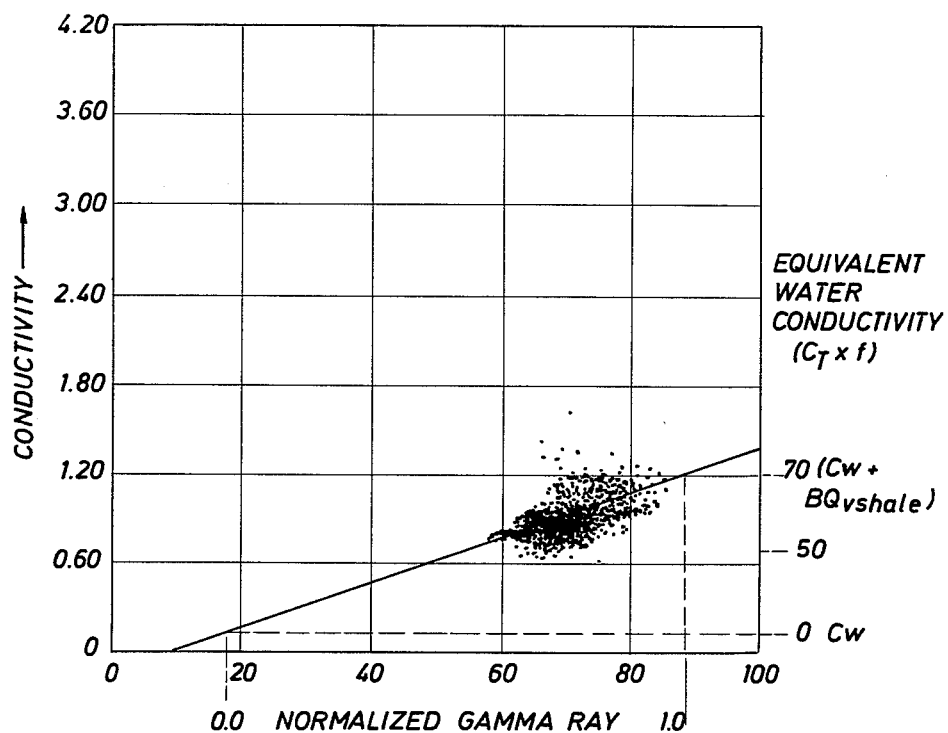
FIG. 3 is a Gamma Ray-Conductivity graph showing the method for estimating $BQ_V$ for shale.

Assuming the bulk shale mineralogy does not change over a given interval, $BQ_v$ shale can be determined by crossplotting normalized gamma ray response vs. conductivity as shown in FIG. 3.

When measured conductivity ($C_T$) is multiplied by either known or estimated formation resistivity factor ($F^*$), $BQ_v$ shale is the slope of the crossplot relationship.

Through this normalized γ-ray—excess conductivity relationship [$\Delta C_T \Delta F / \Delta \gamma$-ray], one can predict shale swelling tendency and cation exchange capacity from a normalized gamma ray response.

The slope of a normalized γ-ray—excess conductivity relationship tends to remain constant within the same formation, which can be hundreds of feet thick. However, the slope may be different in different formations. Thus, many crossplots must be examined and interpreted so that the normalized γ-ray—excess conductivity slope can be changed where appropriate.

The salinity of the water in which the clays are immersed is directly proportional to the $C_w$ intercept on the righthand side of the plot of FIG. 3.

The two parameters, $C_w$ and $BQ_v$, can be used to design drilling fluid systems so that casing can be set before significant shale hydration. This log analysis procedure could substitute for the techniques set out in U.S. Pat. No. 4,495,292. The two main advantages of the present method are that (1) no wet chemical analysis techniques are involved, and (2) the depth of the problem swelling shale is known. The latter is not true in a method relying upon cuttings which are well mixed when they arrive at the surface.

A shale's swelling tendency, however, is only part of the problem in predicting borehole failure. The rate of shale swelling from hydration can vary drastically depending on the initial structure of the shale. A shale which is highly fractured, with the same electrical properties and ultimate swelling tendency, can fail ten to one hundred times faster than an unfractured shale due to its initial structure. A fractured shale is initially much weaker than an unfractured shale. Further, the existing fracture planes provide easy avenues for deep penetration of fresh water drilling fluid into the formation. When this occurs, the initial hydration occurs along initial planes of weakness and failure can occur rapidly.

The progress of shale hydration and its effect on borehole stability can be monitored through repeated logging of a formation. Following are two examples which demonstrate this technique.

Figure 4:
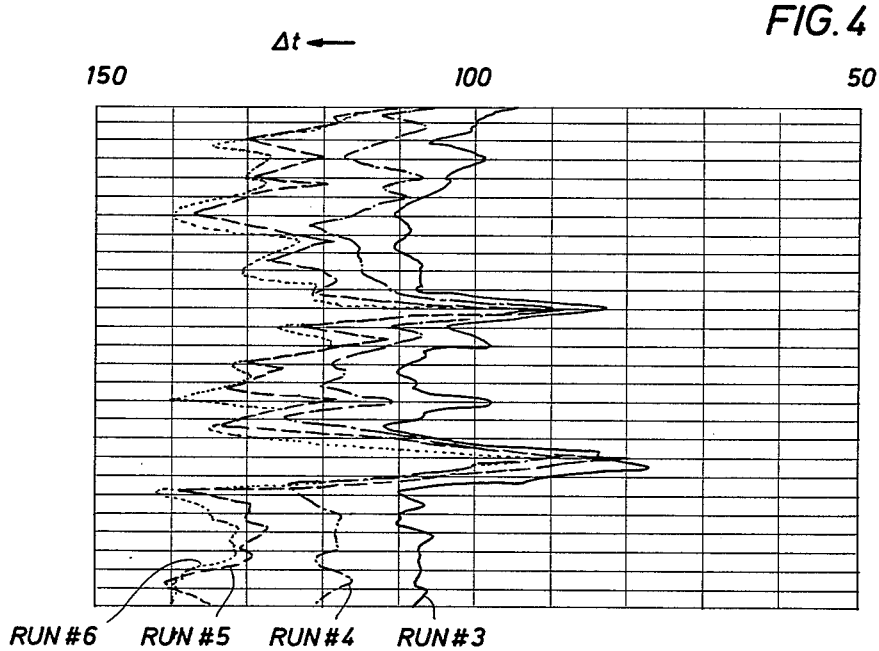
FIG. 4 is a sonic logging graph showing the effect of shale hydration over several logging runs.

FIG. 4 shows the effect of shale hydration on a transit time log. These logging runs occurred as follows:

| Run No. | Days After Initial Penetration |
|---|---|
| 3 | 3 |
| 4 | 13 |
| 5 | 25 |
| 6 | 35 |

In this example, clean sandstones with low swelling potential have initial transit times below 115 microseconds/foot. Shaley sandstones and shales have initially higher transit times. Through time, the clean sandstones show little change in transit time indicating no change in structure or porosity. However, the shales and shaley sandstones show increases in transit time from 7 to 20 microseconds per foot, indicating that shale hydration has occurred. In general, the risk of borehole failure is proportional to this increase in transit time. The shale from 9300' to 9328' decreased about 10 microseconds/foot. It is more stable than the shales above or below. The lower shales have transit times in the 135-150 microsecond/foot range. These shales have a high failure risk. For comparison, the transit time of water, which has no shear strength, is 190-200 microseconds/foot.

Figure 5C:
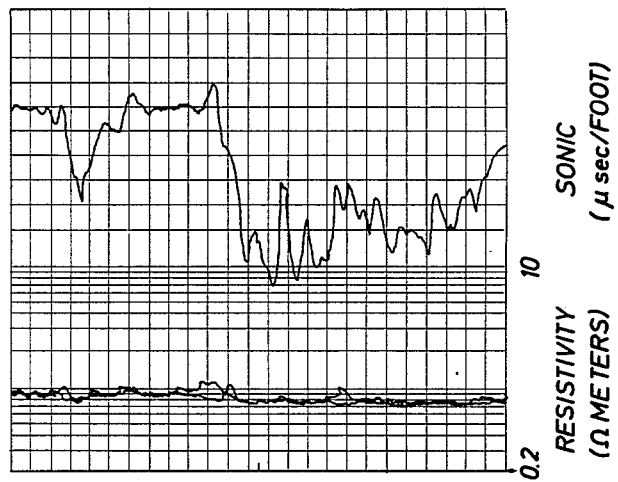
FIGS. 5A, 5B and 5C are a set of graphs of sonic and resistivity logs (ISF/Sonic) showing the effect of shale hydration over a time period.
Figure 5B:
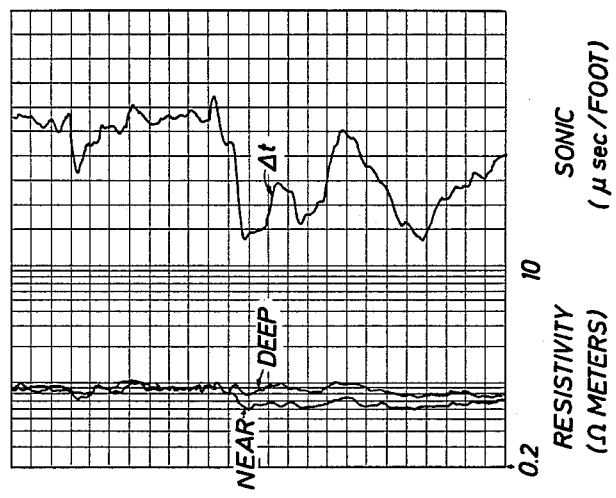
Figure 5A:
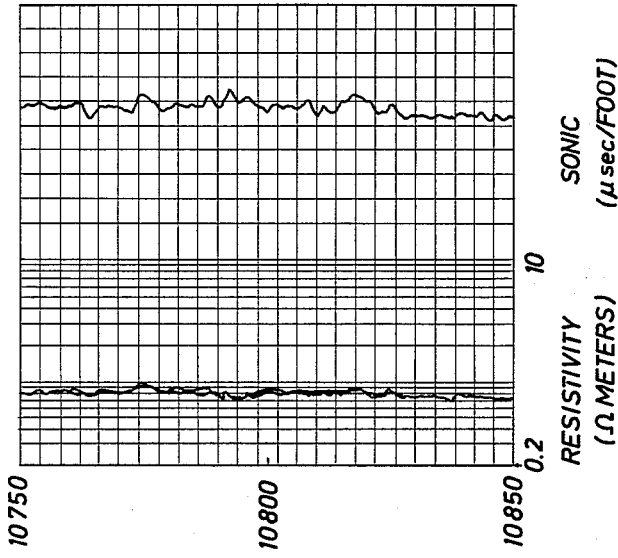

FIGS. 5A, 5B and 5C show the effect of shale hydration on resistivity and transit time:

| Logging Run No. | Time Since Initial Penetration |
|---|---|
| 1 (FIG. 5A) | 1 day |
| 2 (FIG. 5B) | 8 days |
| 3 (FIG. 5C) | 11 days |

This stratigraphic interval is composed of shales and a few very shaley sands. The shale from 10790 to 10850 does not show any anomalous resistivity or transit time on the initial logging run. However, during the second logging run (8 days later), the sonic transit time had increased from 100 to 150 microseconds/foot. The near borehole resistivity (SFL-E) decreased from 0.9 to 0.6 m. Both measurements indicate a considerable increase in average shale porosity. Any other porosity sensitive logging measurement would be similarly affected.

There was further shale hydration between Run No. 2 and Run No. 3. Average shale transit time continued to increase between 10790' and 10850'. A caliper log run at this time indicated that the borehole had closed in by about one inch in this interval. The open hole below 10790' could have been lost if this well were not cased rapidly at this time.

Shale swelling can produce enough of an increase in the dimensions of the formation that the stress within the shale can cause fracturing or plastic deformation which will further decrease the shale's strength. If such swelling is allowed to proceed, i.e. the well is not cased, then failure of the shale formation will result. Absorption of drilling fluid by shale produces, in addition to swelling, a reduction in the shale's electrical resistivity, due to an increase in the fluid content. The relation between the change in electrical resistivity and swelling stress within the shale can be determined in the laboratory for different types of shales. This testing must be done under an in situ simulated condition.

By repeating logging measurements of shale formations during and after drilling of a well, the change in a logged characteristic of the shale over a time period can be noted. This change in characteristic can then be used to predict the increase in the swelling stress in the shale. The swelling stress can be used to estimate the stability condition of the well bore, including how close the well bore currently is to instability and the time to failure of the formation. With this information available, modifications can be made to the drilling program to minimize the potential problems and causes of well bore instability.

The foregoing disclosure and description of the invention is illustrative and explanatory thereof, and various changes in the method steps may be made within the scope of the appended claims without departing from the spirit of the invention.

What is claimed is:

1. A method for monitoring the stability of an earth borehole through a shale formation, said borehole containing drilling fluid, comprising the steps of:
   running, at a first point in time, a well logging instrument through the borehole along the shale formation of interest, while taking an initial measurement of a characteristic of said shale formation;
   running, at a second point in time subsequent to said first point in time, a well logging instrument through the borehole along said shale formation of interest, while taking a second measurement of said characteristic of said shale formation; and
   combining said first and second measurements to determine the extent to which the shale formation of interest has swelled due to the interaction of the drilling fluid in the borehole with the said shale formation.

2. The method according to claim 1, including, in addition thereto, the step of comparing the extent to which the shale formation has swelled with known test results from similar shale formations.

* * * * *